United States Patent [19]

Schultz

[11] Patent Number: 5,758,893
[45] Date of Patent: Jun. 2, 1998

[54] TRAILER HITCH ACCESSORY WITH DROP-DOWN GUIDING MEMBER

[76] Inventor: Todd M. Schultz, P.O. Box 365, Cedarburg, Wis. 53012

[21] Appl. No.: 607,758

[22] Filed: Feb. 27, 1996

[51] Int. Cl.[6] .................................................. B60D 1/36
[52] U.S. Cl. .................................................. 280/477
[58] Field of Search ........................ 280/477, 478.1, 280/511

[56] References Cited

U.S. PATENT DOCUMENTS

| | | | |
|---|---|---|---|
| 2,818,276 | 12/1957 | Sprang | 280/477 |
| 3,588,145 | 6/1971 | Thompson | 280/477 |
| 4,657,275 | 4/1987 | Carroll | 280/477 |
| 4,666,177 | 5/1987 | Vinchattle | 280/477 |
| 4,792,151 | 12/1988 | Feld | 280/477 |
| 4,844,496 | 7/1989 | Webb et al. | 280/477 |
| 4,903,978 | 2/1990 | Schrum, III | 280/477 |
| 5,080,386 | 1/1992 | Lazar | 280/477 |
| 5,114,170 | 5/1992 | Lanni et al. | 280/477 |
| 5,120,079 | 6/1992 | Boggs | 280/477 |
| 5,161,815 | 11/1992 | Penor, Jr., | 280/477 |
| 5,435,587 | 7/1995 | Beddows | 280/477 |
| 5,503,422 | 4/1996 | Austin | 280/477 |

OTHER PUBLICATIONS

Brochure for Handi Hitch™ from Big Boy, Division of MultiTech Industries, Ltd., Mar. 1997.

*Primary Examiner*—Kevin Hurley
*Attorney, Agent, or Firm*—Quarles & Brady

[57] ABSTRACT

A device (10) that facilitates the coupling of a socket-type coupling (34) of a trailer to a vehicle (12) that tows the trailer. The device (10) enables a single unaided individual to back a vehicle equipped with a hitch ball (30) into a socket-type coupling (34) of a trailer. The device (10) includes a substantially "V"-shaped ramp (14) inclined about the hitch ball (30) that, upon the backing of the vehicle, guides the socket coupling (34) of the trailer to a trigger position above the hitch ball (30). When it reaches such trigger position, the socket coupling (34) impacts an abutment (20) to pivot a support member (24) from its supporting position to a release position, to allow the ramp member (14) to drop down below the hitch ball (30) and allow the socket coupling to drop onto the hitch ball (30).

4 Claims, 4 Drawing Sheets

TRAILER HITCH ACCESSORY WITH DROP-DOWN GUIDING MEMBER

BACKGROUND OF THE INVENTION

1. Field of the Invention

The present invention relates to a trailer hitch guiding device. More particularly, it relates to a trailer hitch guiding device that permits a driver of a vehicle to back up and align the socket of a trailer coupling member with the hitch ball attached to the vehicle without the assistance of any other person or persons to direct and guide the driver.

2. Description of the Prior Art

As is well known in the art, even with the assistance of a second individual to guide and direct the driver of a towing vehicle to precisely place the hitch ball on the vehicle in alignment with and directly under the socket on the trailer member can be a long and frustrating experience. The coupling elements (i.e., hitch ball and socket) are not normally visible to the driver, especially during the final increments of movement of the vehicle as it is being backed towards the trailer for hitching purposes. This process is generally carried out with the assistance of a person standing in proximity to the socket of the trailer in order to guide and direct the driver into proper hitching alignment. This long and frustrating experience is compounded when the coupling operation must be performed without the assistance of a second individual to guide and direct the driver. Thus, this lone driver must resort to the trial and error method wherein the lone driver backs the towing vehicle towards the trailer, and periodically stops the vehicle, gets out to observe the alignment and position of the hitch ball in relationship to the socket, and returns to the driver's seat to make adjustments and resume backing. This procedure must be repeated until proper alignment is achieved to place the hitch ball in longitudinal alignment with and directly under the trailer socket until the hitching process is completed. Dim light, inclement weather, uneven terrain, cargo obstructions, and other distractions further compound this trial and error procedure to effect a hitching operation by a lone individual.

U.S. Pat. No. 4,844,496, issued Jul. 4, 1989 to Webb et al., discloses a slidable attachment for a vehicle bumper such that a single person driving a vehicle is able to hitch the vehicle to a trailer. This device requires a particular type of vehicle bumper and hitch ball, and this device merely slides about the hitch ball, it is subject to falling off of the vehicle. In addition, this device is not usable universally with various hitch balls and vehicle bumpers. U.S. Pat. No. 5,114,170, issued May 19, 1992 to Lanni et al., discloses a trailer coupling guide that provides a tongue member associated with the socket of a trailer to guide a hitch ball into the socket. The tongue member is subject to premature dismantling upon the encounter of the hitch ball. U.S. Pat. No. 4,792,151, issued Dec. 20, 1988 to Feld, and U.S. Pat. No. 5,161,815, issued Nov. 10, 1992 to Penor, Jr. each disclose very elaborate and complex mechanisms for actuating a hitch coupling between the vehicle and a trailer. U.S. Pat. No. 5,120,079, issued Jun. 9, 1992 to Boggs, discloses a bow latch for positively and properly positioning the bow hook into the latch.

None of the above inventions and patents, taken either singly or in combination, is seen to describe the instant invention as claimed.

SUMMARY OF THE INVENTION

Consequently, there is a need for a trailer coupling guide that will overcome the aforementioned problems, as well as, maintain significant accuracy, economy, and efficiency, which has not been shown in the prior art when taken as a whole in accordance with the requirements of law.

Accordingly, it is a principal object of the invention to provide a trailer hitch for single individual hitching procedures.

It is another object of the invention to provide a trailer hitch which automatically guides the coupling elements (i.e., the hitch ball and socket) into proper alignment.

It is a further object of the invention to provide a trailer hitch that positions the socket upon the hitch ball automatically.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
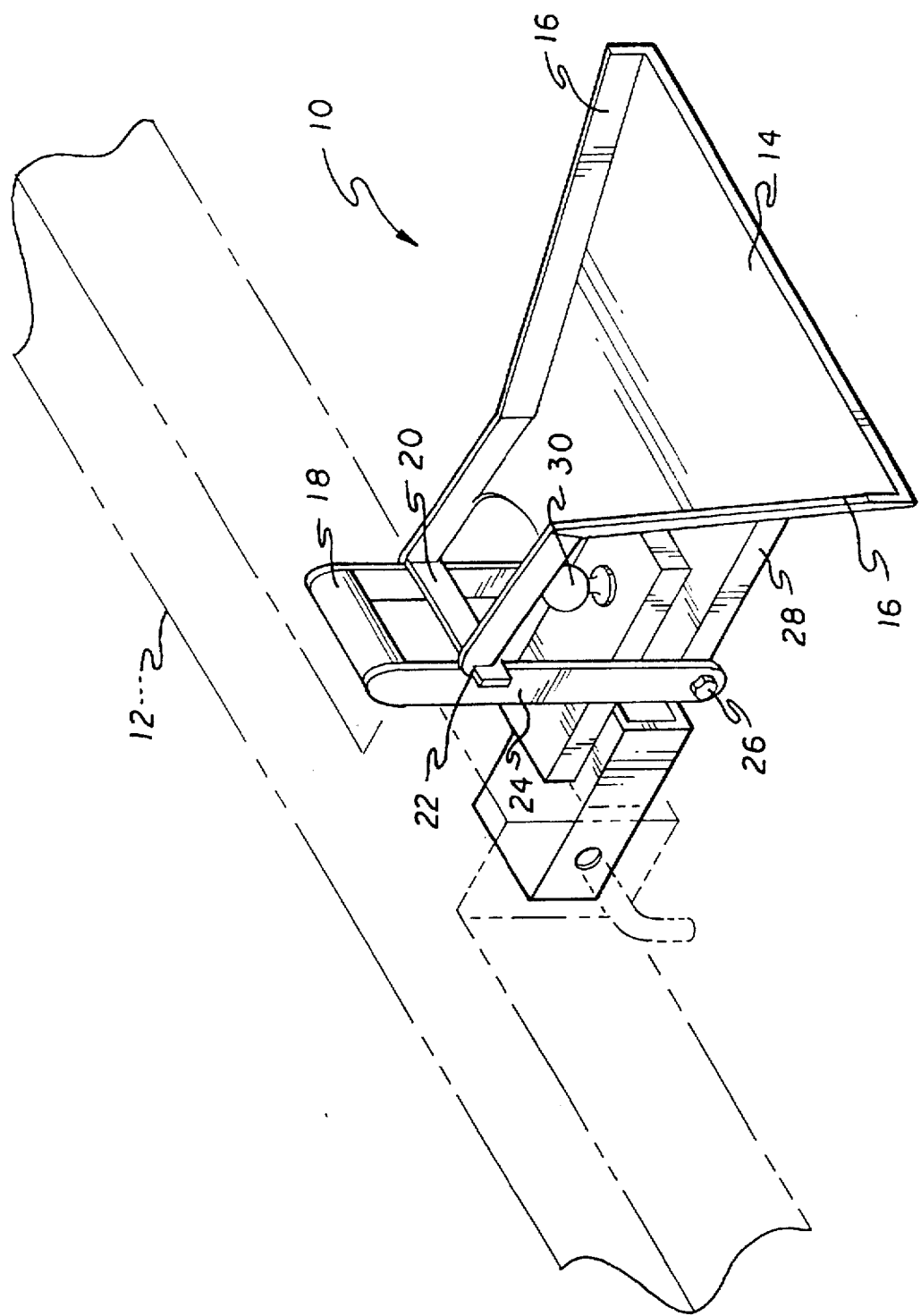
FIG. 1 is a perspective view of the present invention in the raised position.
Figure 2:
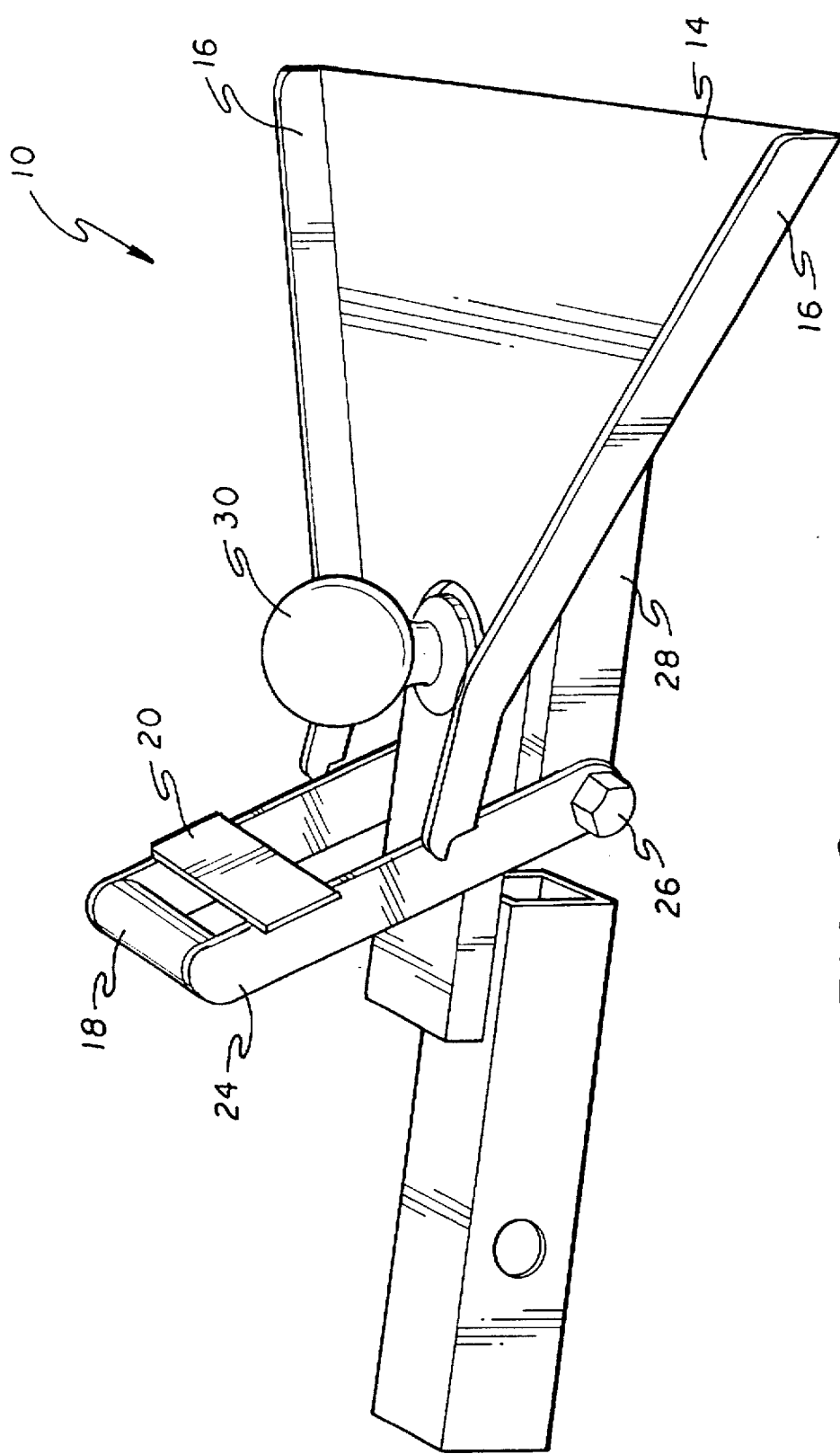
FIG. 2 is a perspective view of the present invention in the lowered position.

FIGS. 1–4 illustrate a preferred embodiment of the present invention for guide accessory 10 for a trailer hitch. The guide accessory 10 can be retrofitted to existing trailer hitches or integrated with new hitches. The hitch accessory 10 has three major members: a pivotable ramp member 14, a base member 28 and a pivotable support-trigger member 24 having spaced apart legs. The base member 28 is secured to the hitch ball 30 of a towing vehicle via the hitch ball support 36, typically a nut and bolt type connection. The base support 28 has a predetermined length, and the connection point where the hitch ball support 36 intersects the base member 28, divides the predetermined length of the base into a long side and a short side. The length of the long side of the base member 28 is in the range of 75% to 85% of the predetermined length of the base member 28. Respectively, the length of the short side of the base member 28 is in the corresponding range of 25% to 15% of the predetermined length. At the long side end of the base member 28, a first connector 32—typically a bolt and nut, provides a pivotal connection point for the base member 28 and the ramp 14. At the short side end of the base member 28, a second connector 26, also typically a bolt and nut, provides a pivotal connection point for the base member 28 and the support trigger member 24.

The ramp member 14 of the hitch guide 10 has a generally trapezoidal shape, Which tapers from an open end towards a narrower end proximate the hitch ball 30. A second, smaller portion of the ramp member 14 has a rectangular shape proximate the hitch ball 30 and the top of the trapezoidal shape has an arcuate portion removed therefrom. The diameter of the arcuate opening is greater than the diameter of the hitch ball 30. This arcuate opening allows the ramp member 14 to rotate about the first pivotal connector 32, in the region of the hitch ball 30 without physically contacting the hitch ball 30. Along the sides of the ramp member 14 are a pair of side guide walls 16. The purposes of the side guide walls 16 are discussed in greater detail below.

The support trigger member 24 is rigidly connected by a handle 18 and an abutment member 20. The handle 18 and the abutment member 20 cause the support trigger member 24 to move in unison. The abutment member 20 and the side guide walls 16 of the ramp member 14 having spaced apart grooved portions 22 forming a tongue-in-groove connection with abutment member 20 for supporting the ramp member 14. The locking connection is a releasable type connection upon impact.

Figure 3:
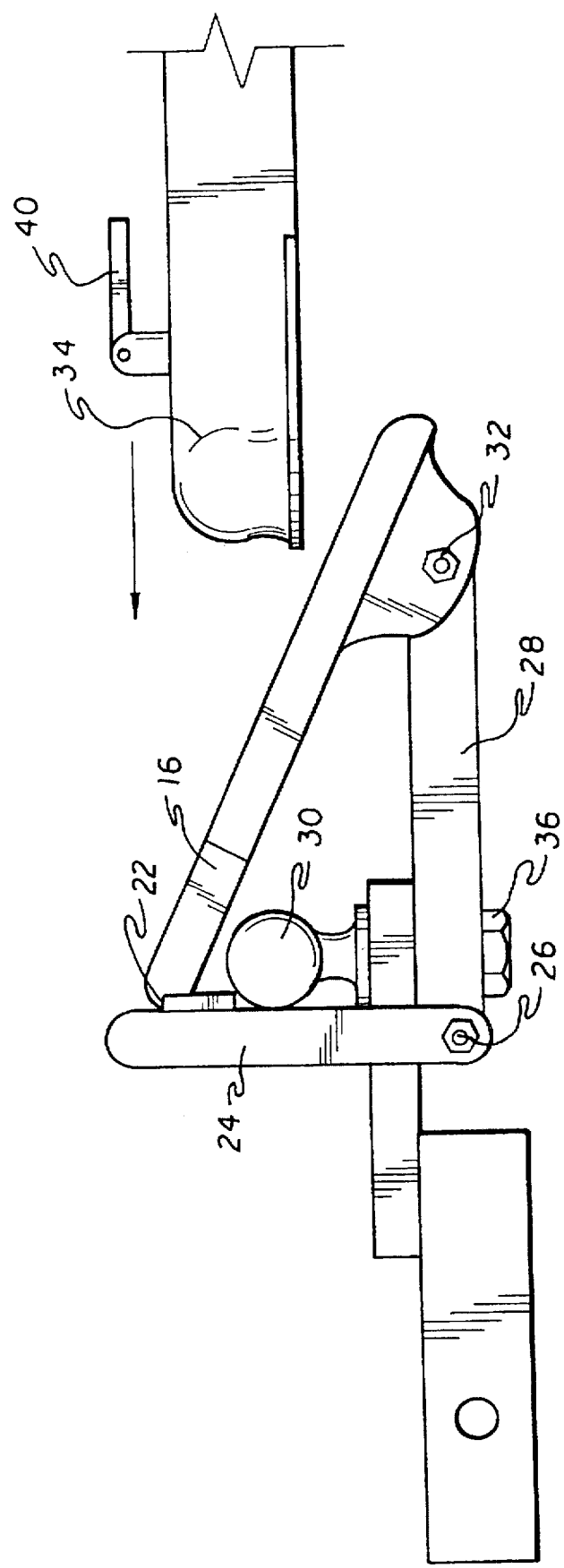
FIG. 3 is a side view of the present invention in the raised position with the socket of a trailer relatively approaching.
Figure 4:
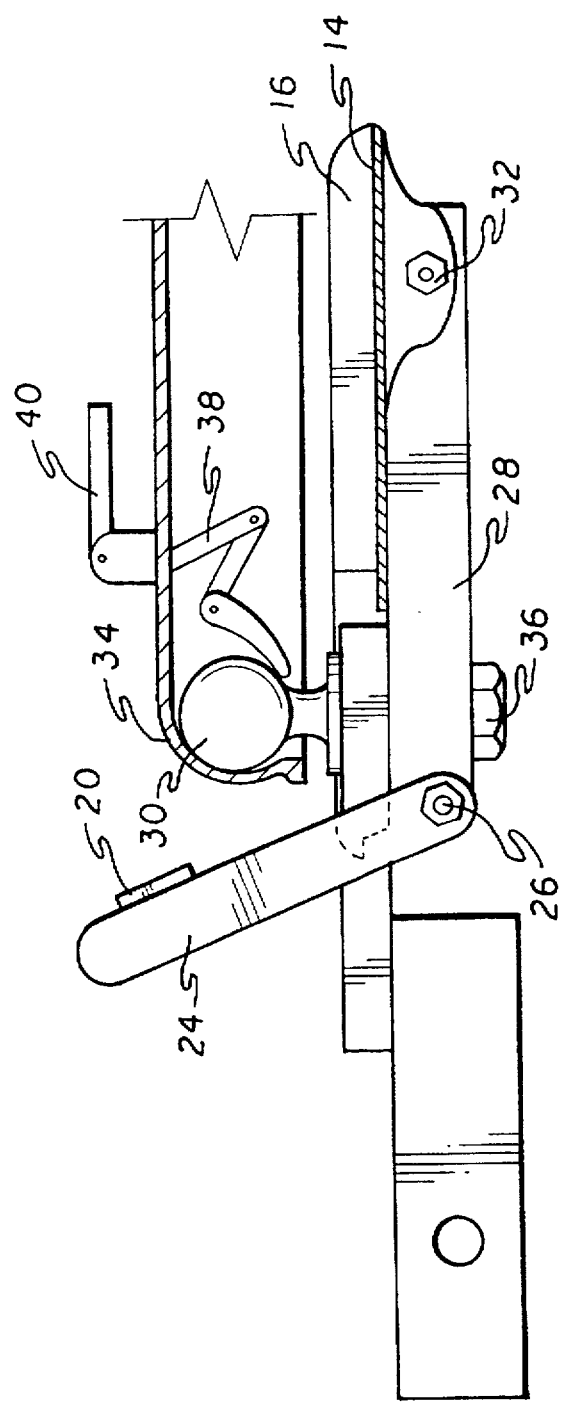
FIG. 4 is a side cross-sectional view of the present invention in the lowered position after engaging the socket of a trailer.

As can be best seen from FIGS. 3 and 4, the operation of the hitch accessory 10 will now be discussed. The hitch accessory 10 is mounted about the hitch ball 30 by mounting base member 28 the hitch ball support 36. The ramp member 14 is manually rotated about the pivotal first connection 32 until the top of the ramp member 14 clears the height of the hitch ball 30 and the abutment member 20. Gripping handle 18, the support-trigger member 24 is rotated about the pivotal second connection 26 until the abutment member 20 aligns under the ground ends of side guide walls 16. The ramp member 14 is then lowered until the ground ends of the side guide walls 16 engage the abutment member 20, forming a stable supporting connection with spaced apart grooved portions 22. The connection will remain stable until an impact forces the disengagement of the connection abutment member 20. Once in the raised position, the driver of the towing vehicle backs the towing vehicle toward a hitch socket 34 on a trailer. The ramp member 14 and side guide walls 16 contact the front end of the socket 34 and direct the socket 34 up the ramp member 14 until the socket 34 is aligned over the hitch ball 30. The abutment member 20 is positioned just above the end of the ramp member proximate the hitch ball 30, so that when hitch socket 31 slides up the surface of ramp member 34, it will impact the abutment member 20.

This impact produces the necessary force to disengage the abutment 20, forcing the support-trigger member 24 with its spaced apart support legs support legs 24 to rotate about the second pivotal connection 26, releasing the side guide walls 16, and allowing the ramp member 14 to rotate about the first pivotal connection 32, dropping the end portion of the ramp member 14 having the accurate opening past the hitch ball 30. The end result is the socket 34 ultimately seats properly on hitch ball 30. Once seated, the socket latch 38 is secured to the hitch ball 30 by way of the latch actuator 40.

It is to be understood that the present invention is not limited to the sole embodiment described above, but encompasses any and all embodiments within the scope of the following claims.

I claim:

1. Guiding apparatus for use in combination with a hitch ball and a hitch ball support on a towing vehicle, and a ball-engaging end of a trailer hitch to be hitched to said towing vehicle, said apparatus comprising:

a pivoting ramp member which when positioned on said hitch ball support, pivots between a first ramp position in which the end proximate the hitch ball is held above the hitch ball and a second ramp position in which the end more proximate the hitch ball drops down below at least a portion of the hitch ball to allow the ball-engaging end of the trailer hitch to drop down onto the hitch ball, said pivoting ramp member having spaced apart grooved portions formed at the end more proximate the hitch ball; and a pivoting support having an upper end with a handle for gripping, having a laterally extending ramp support positioned below the handle to receive the spaced apart grooved portions of the ramp member and having a lower end for pivotal mounting between the hitch ball and the vehicle so as to pivot between a supporting position in which the ramp support supports the ramp member in the first ramp position, and a release position in which the ramp support pivots away from the ramp member to allow the ramp member to drop down, said ramp support having said positioned at a height just above a sliding surface of the ramp member in the first ramp position so that as a ball-engaging end of the trailer hitch slides up the sliding surface of the ramp member, the ball-engaging end will impact the ramp support to pivot the ramp support from the supporting position to the release position and allow the ramp member to drop down to the second ramp position while allowing the ball-engaging end to come to rest on the hitch ball.

2. The guiding apparatus of claim 1, wherein said pivoting support has spaced apart legs passing on lateral opposite sides of said hitch ball when said pivoting support is positioned on said hitch ball support member, and is pivoted between said supporting position and said release position.

3. The guiding apparatus of claim 2, wherein in said supporting position, said legs of said pivoting support are substantially upright.

4. The guiding apparatus of claim 3, further comprising a base for rigid mounting on the hitch ball support; and wherein the pivoting support and the ramp member are each pivotally mounted on said base.

* * * * *